(12) United States Patent
Moselle (10) Patent No.: US 7,812,253 B2
(45) Date of Patent: Oct. 12, 2010

(54) FIRE RESISTANT BARRIER

(75) Inventor: Happy Moselle, Burnsville, MN (US)

(73) Assignee: E.Z. Barrier, Inc., Burnsville, MN (US)

( * ) Notice: Subject to any disclaimer, the term of this patent is extended or adjusted under 35 U.S.C. 154(b) by 1147 days.

(21) Appl. No.: 10/988,794

(22) Filed: Nov. 15, 2004

(65) Prior Publication Data
US 2007/0175649 A1 Aug. 2, 2007

(51) Int. Cl.
*H02G 3/08* (2006.01)
(52) U.S. Cl. ............... 174/50; 174/58; 174/480; 248/343; 52/232
(58) Field of Classification Search .......... 174/66, 174/67, 50, 480, 58, 650; 220/3.2, 3.8, 241, 220/242, 378; 52/220.1, 232; 29/729, 739, 29/525.1; 439/535; 248/906, 343
See application file for complete search history.

(56) References Cited

U.S. PATENT DOCUMENTS

| | | | |
|---|---|---|---|
| 3,622,029 A | 11/1971 | Ware | |
| 3,690,501 A | 9/1972 | Ware | |
| 3,803,341 A | 4/1974 | Klinkman et al. | |
| 3,917,101 A | 11/1975 | Ware | |
| 3,980,197 A | 9/1976 | Ware | |
| 4,057,164 A * | 11/1977 | Maier | 220/3.6 |
| 4,375,142 A | 3/1983 | McDonald et al. | |
| 4,400,766 A | 8/1983 | Munson et al. | |
| 4,605,139 A | 8/1986 | Dacar | |
| 4,616,104 A | 10/1986 | Lindsey | |
| 4,667,840 A * | 5/1987 | Lindsey | 220/3.2 |
| 4,850,173 A | 7/1989 | Beyer et al. | |
| 5,012,043 A | 4/1991 | Seymour | |
| 5,222,800 A | 6/1993 | Chan et al. | |
| 5,456,050 A | 10/1995 | Ward | |
| 5,461,838 A | 10/1995 | Heller | |
| 5,609,006 A | 3/1997 | Boyer | |

(Continued)

FOREIGN PATENT DOCUMENTS

JP 6 78434 3/1994

(Continued)

OTHER PUBLICATIONS

USG Corporation, Thermafiber® Light Fixture Protection Kits, Fact Sheet, Oct. 1999, 2 pgs.

(Continued)

*Primary Examiner*—Dhiru R Patel
(74) *Attorney, Agent, or Firm*—Crompton, Seager & Tufte LLC (57) ABSTRACT

A fire resistant assembly, which may comprise a first layer having a lumen therein, a second layer adjacent the first layer, a first structural member disposed between the first and second layers, and a box having a cavity defined by a wall, a first opening in the wall, a flange proximate the first opening, and optionally a second opening in the wall, wherein the box is disposed between the first layer and the second layer and wherein the opening is disposed on the lumen of the first layer, the box comprising a further fire resistant feature such as an intumescent ring disposed about the second opening, a plenum wrap layer, or an intumescent layer, and various methods and apparatuses related thereto.

36 Claims, 4 Drawing Sheets

U.S. PATENT DOCUMENTS

| | | | |
|---|---|---|---|
| 5,750,927 A | | 5/1998 | Baltazar |
| 5,814,764 A | * | 9/1998 | Kohaut ........................ 174/360 |
| 5,823,664 A | | 10/1998 | Demshki, Jr. et al. |
| 5,887,396 A | | 3/1999 | Thoreson |
| 6,105,334 A | | 8/2000 | Monson et al. |
| 6,119,411 A | | 9/2000 | Mateu Gil et al. |
| 6,252,167 B1 | * | 6/2001 | Rose ........................... 174/66 |
| 6,357,891 B1 | | 3/2002 | Newbold et al. |
| 6,360,502 B1 | | 3/2002 | Stahl, Jr. |
| 6,412,249 B1 | | 7/2002 | Boyer et al. |
| 6,698,146 B2 | | 3/2004 | Morgan et al. |
| 6,838,618 B2 | | 1/2005 | Newbold et al. |

FOREIGN PATENT DOCUMENTS

| | | |
|---|---|---|
| JP | 6 86424 | 3/1994 |
| JP | 6 98441 | 4/1994 |

OTHER PUBLICATIONS

*Fire Resistance Ratings—ANSI/UL 263, Guide Information for Fire Resistance Rating*, Online Certifications Directory, http://database.ul.com/cgi-bin/XYV/template/LISEX/1FRAME/showpage.html?&name=BXUV.Guideinfo&ccnshorttiele=Fire&Resis Jul. 2, 2002, pp. 1-41.

*Fire Resistance*, Design Solutions-Fire Construction-Fire Tests-Fire Resistance, http://www.usg.com/Design_Solutions/2_2_10_fire_endure.asp Jul. 2, 2002, pp. 1-5.

*Fire Resistance Ratings—ANSI/UL 263, Guide Information*, Online Certifications Directory, http://database.ul.com/cgi-bin/XYV/template/LISEXT/1FRAME/showpage.html?name=BXUV.L528&ccnshorttitle=Fire+Resistances+ Jul. 2, 2002, pp. 1-12.

* cited by examiner

FIRE RESISTANT BARRIER

FIELD OF THE INVENTION

The invention relates to a fire barrier having a recess for a device. More particularly, the invention relates to a recessed box installed in a building for use with maintaining a minimum fire endurance of a building surface.

BACKGROUND OF THE INVENTION

Typically, a surface of a building such as a floor, a ceiling between levels, or a ceiling under an attic provides a fire barrier. A fire barrier resists the spread of a fire through it by providing a resistance to flammability, a resistance to heat transmission, and sufficient structural integrity to resist decomposing when exposed to heat or flames. The effectiveness of a fire barrier is often rated by exposure to a fire of specified and increasing intensity and a rating is a period of time, typically in hours during which the fire barrier is effective. When an aperture is made in one of these fire barriers, the effectiveness of the fire barrier is decreased dramatically. Often it is nonetheless desirable to create an aperture in a fire barrier, for example, to install recessed lighting or a floor drain. To restore the fire barrier and maintain an effective minimum resistance to fire, a construction worker will typically build a box of gypsum board and install it around the recessed fixture proximate the aperture created in the fire barrier. The construction of this box is a time consuming task and provides no mechanism to ascertain to what degree the effectiveness of the fire barrier is restored. Moreover, many fixtures have large conduits such as pipes or cable servicing them. Constructing a box that provides egress for these conduits while maintaining integrity as a fire barrier is often a time-consuming and chancy process. Also, many fire barrier boxes constructed at the job site may prove inadequate for applications requiring extended fire ratings, such as two hours or more.

SUMMARY OF THE INVENTION

One embodiment pertains to a box for maintaining the integrity of a fire barrier in a building while permitting the installation of a recessed fixture such as a light, an exhaust fan, or a speaker. The box may be made from steel or other suitable material and may optionally have a flange for convenient mounting to structural members such as ceiling joists, wall studs or floor trusses. The box has a first opening through which the fixture may be mounted and a second opening which provides access to provide service to the fixture. For example, the second opening may be sized to provide access to electrical conduit. Surrounding the second opening is an intumescent material such as an intumescent ring.

Another embodiment pertains to another box for maintaining the integrity of a fire barrier while permitting the installation of a recessed fixture. This box has a first layer made of steel or other suitable material and a second layer which is made from a plenum wrap or other similar material. The second layer may be spaced apart from the first layer to provide an additional thermal barrier and may be provided inside or outside the first layer. The box has a first opening through which a fixture may be mounted and may have a second opening.

Another embodiment pertains to another box for maintaining the integrity of a fire barrier. This box may be made from steel or other suitable material and may have a flange to provide means for convenient mounting to a structural member. The box includes an intumescent layer or wrap.

Another embodiment pertains to a fire barrier including a box such as one of those described above. The fire barrier is typically a building member such as a wall or an attic ceiling. The building member includes two planar surfaces with structural members disposed therebetween. The box is attached, such as by the flange, to one or two of the structural members such that one side of the box is flush with one of the planar surfaces and the opposite side of the box is at least a predetermined distance from the other planar surface. A hole may be provided in the former planar surface where the first opening of the box is and a fixture may be installed therein. The box may be rated to have a 2 hour fire endurance rating under ASTM E-119 or other comparable test and certification of the rating may be found with or on the box In certain embodiments, an intumescent material such as an intumescent foam or other suitable intumescent material may be used with the box. Such a material can provide a material sound deadening quality so the box can be installed in a fire barrier so the fire barrier has a sound transmission rating.

The above summary of some embodiments is not intended to describe each disclosed embodiment or every implementation of the present invention. The figures and detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings in which.

DETAILED DESCRIPTION OF ILLUSTRATIVE EMBODIMENTS

Figure 1:
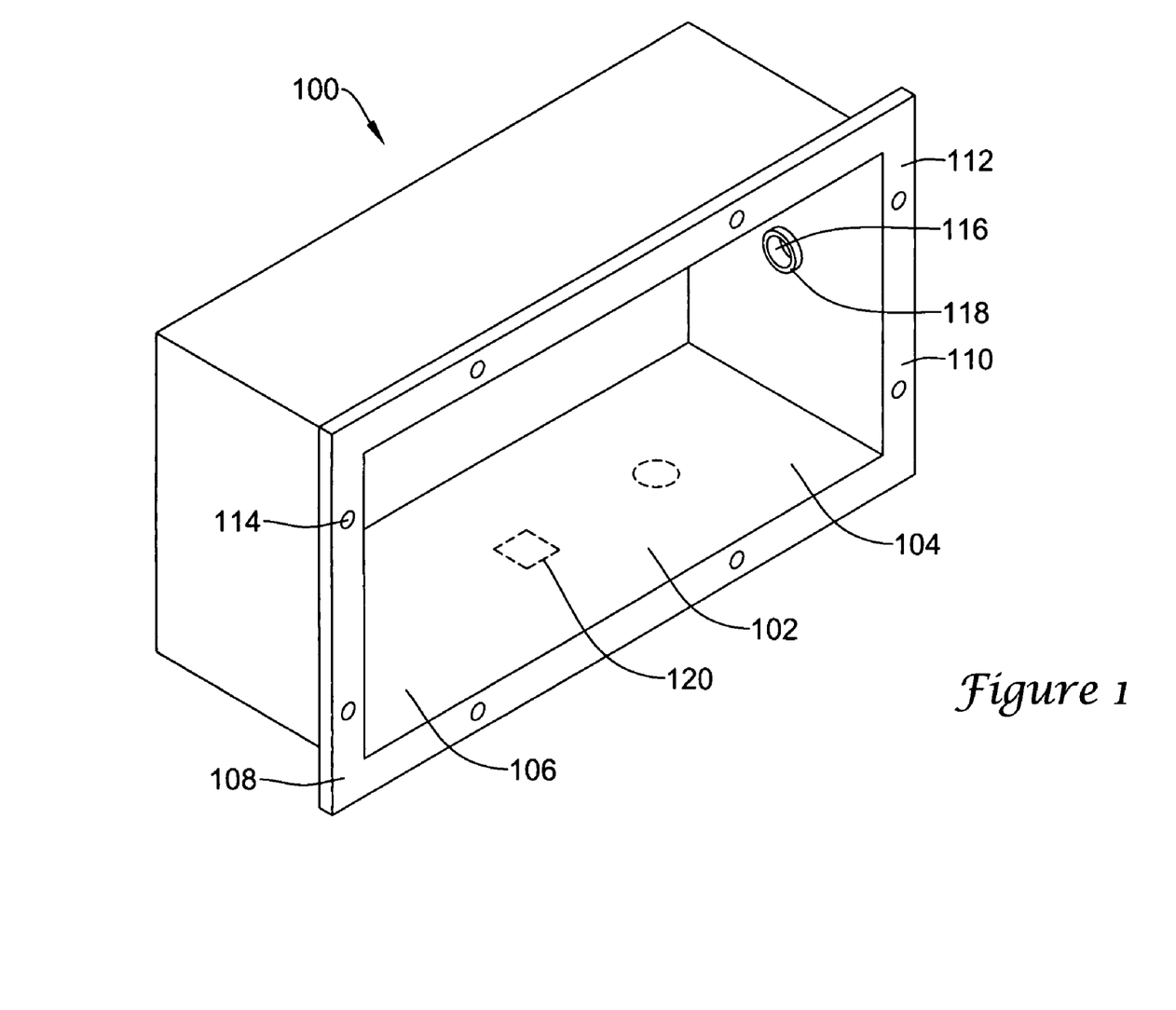
FIG. 1 is a perspective diagrammatic view of a box 100 for providing fire resistance according to the invention.

Reference is now made to the figures, in which like element numbers refer to like elements throughout. FIG. 1 is a perspective view of a box 100, which includes a wall 104 defining cavity 102. Opening 106 provides access to cavity 102 and flange 108 is disposed proximate opening 106. It is to be understood that, while wall 104 is shown in FIG. 1 to be comprised of five flat surfaces and the opening, any shape defined by a cavity and having an opening may be suitable. For example, a cylinder open at one end may be suitable.

Flange 108 may be comprised of one or more individual pieces 110 and generally defines a flat surface 112 facing away from cavity 102. Flange 108 is shown as comprising a lip extending a uniform distance away from the edge of the opening. It is to be understood however, that many more configurations that may be suitable are contemplated. For example, flange 108 may have struts which extend over the opening to provide means for attaching a device such as a light fixture. In addition, flange 108 may have wings that extend from the opening to provide additional means for attaching the box in the fire barrier. Flange 108 may include means for attaching box 100 to a structural member such as lumens 114 for receiving nails or screws.

Wall 104 may include an additional opening 116 for providing service to a fixture installed in cavity 102. Opening 116 may be surrounded by an intumescent ring 118. An intumescent material is one that expands when in contact with fire or high heat but resists further deterioration. Many intumescent materials expand to eight or more times their original volume, producing a char which has a high fire resistance. Intumescent ring 118 may be a pre-molded ring installed into opening 116 or may be a paint or mastic applied around opening 116 or may be another suitable intumescent material. Intumescent ring 118 is configured to seal opening 116, sealing around any conduit installed therethrough, when exposed to fire or heat.

Alternatively, wall 104 may include one or more punch-outs 120 that permit ready removal with a hammer or screwdriver for created additional openings to the cavity. Punch-outs 120 generally comprises one or more grooves of reduced wall thickness formed in a closed pattern. Punch-outs 120 may be of several shapes and sizes to allow for the creation of additional openings adapted to specific tasks or in convenient locations. In this embodiment, intumescent ring 118 may be a putty installed around the opening 116 created by the removal of the punch-out.

Figure 2:
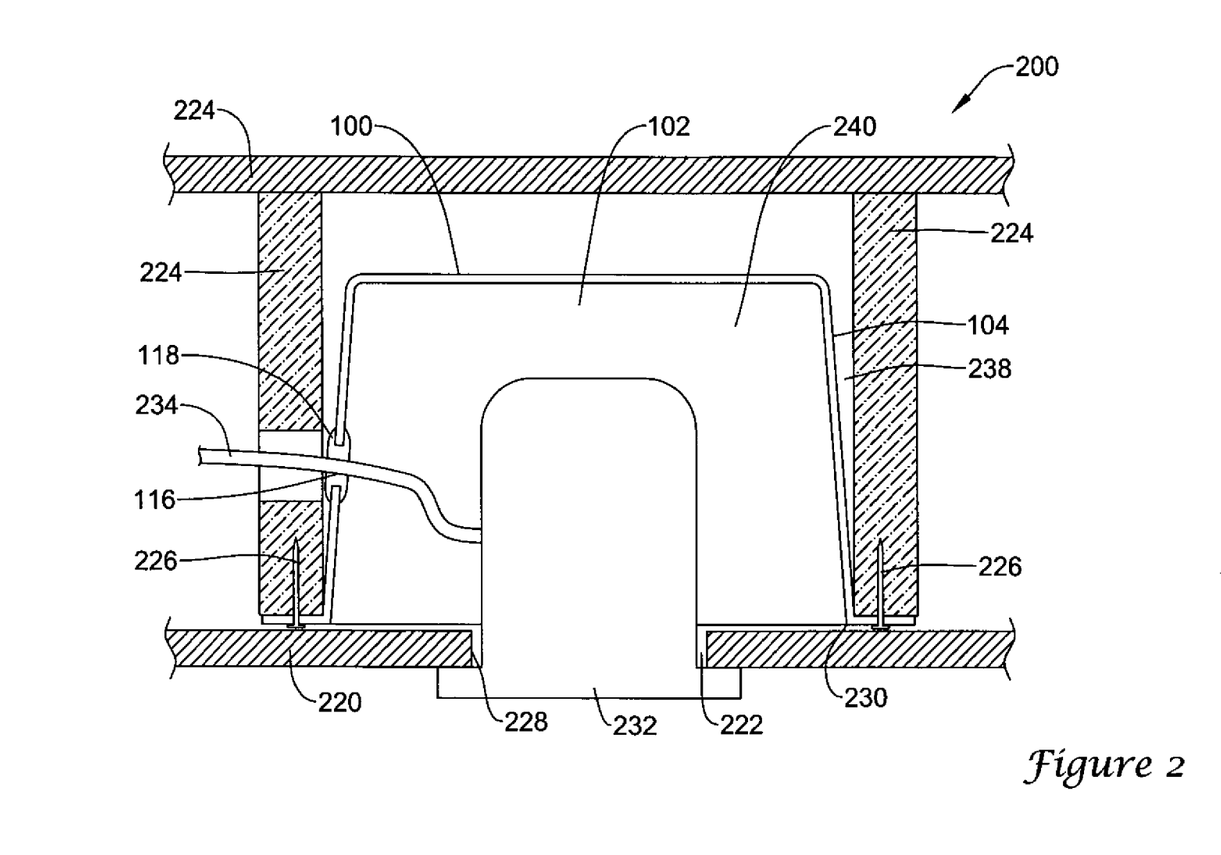
FIG. 2 is a cross sectional diagrammatic view of box 100 positioned inside a fire barrier 200.

Refer to FIG. 2, which is a cross sectional view of box 100 disposed in a fire barrier 200, which is fire resistant and has a device 232 disposed therein.

The term "fire resistant" is herein defined to refer to the ability of a structure to serve as a barrier to the spread of fire. To serve as an effective barrier to the spread of fire, a structure must exhibit the following characteristics. First, it must not pass flame or hot gas from one side to the other. Second, the structure must support the imposed design loads without structural failure or collapse. Third, the structure must resist the transmission of heat so that the surface not exposed to the fire does not exceed the temperature of 250° F. Fourth, the structure must withstand lateral impacts from falling debris. This is definition of the term "fire resistant" as understood by those of skill in the art.

Fire barrier 200 is disposed in a building; suitable fire barriers may comprise a floor and a ceiling, a ceiling and a roof, or a wall and a wall. The fire barrier depicted in FIG. 2 comprises a ceiling and the floor above. Fire barrier 200 may be comprised of a first layer 220 having a lumen 222 therein, a second layer 224, and box 100 disposed therebetween. Fire barrier 200 may also comprise structural members 224, such as joists, to which box 100 may be fastened using fasteners 226. Box 100 may also be fastened using other suitable means such as a high temperature epoxy or spot welding.

Lumen 222 generally has a perimeter 228 which may be smaller than the perimeter 230 of opening 106. Layer 220, therefore, may extend over flange 108 and perimeter 230. A device 232 may be disposed in lumen 222 and extend into cavity 102. This device may be any device installed in a fire barrier. The device may be, for instance, an electrical device such as a light fixture or a fan, or it may be a different device, such as a floor drain. If device 232 is an electrical device, it may have wires 234 extending therefrom. Wires 234 extend through opening 116 surrounded by intumescent ring 118. Alternatively, a punch-out of the appropriate size may be removed, providing an opening though which wires or other servicing conduit may extend. It may be desirable to provide an opening that is not substantially larger than the cross section of the objects extending therethrough in order to maintain the integrity of the fire barrier. Once the punch-out is removed to create an opening or after the conduit has been extended therethrough, an intumescent ring may be provided about the opening. Alternatively, an intumescent ring may be provided about every punch-out. There may be a gap 238 between wall 104 and layer 224 and there may also be a gap 240 between device 232 and wall 104. These gaps may enhance the fire resistance of fire barrier 200.

Layers 220 and 224 may comprise materials well known by those of skill in the art such as gypsum board, plywood, plaster, or tile. Box 100 may be comprised of steel or other material having a melting temperature, for example, above 1700° Fahrenheit such as ceramic. For example, box 100 may be comprised of 24-gauge stainless steel. This material may be galvanized to resist corrosion. Wall 104 may have a perimeter 230 that has an angle with the flange of greater than 90 degrees. This may facilitate stacking of boxes 100. If box 100 comprises joints, these joints should be sealed by welding or another suitable process to make wall 104 substantially impermeable to air flow.

Fire barrier 200 may have an ASTM E-119 fire resistance rating of at least 1 hour or at least 2 hours. A fire resistance rating of 1 hour exposes one side of the fire barrier to the following sequence of temperatures: 1000° F. for 5 minutes, 1400° F. for 15 minutes, 1550° F. for 30 minutes, and 1700° F. for 10 minutes. A fire resistance rating of 2 hours exposes the side of the fire barrier to 1700° F. an additional 50 minutes and to a temperature of 1850° F. for 10 minutes. At no time during this test should the fire barrier permit flames or hot gases through to the unexposed surface or allow the unexposed surface to exceed 250° F. This test was designed to simulate the conditions a real fire might expose a fire barrier to. Of course, if this test is updated to reflect new understandings of the conditions of a fire, the fire barrier should be capable of a comparable rating under the new test.

Fire barrier 200 may be rated under ASTM E-119 or a comparable test. The process of rating includes creating a fire barrier 200 and subjecting it to the test. A rated fire barrier 200 may permit installation of box 100 in fire barriers governed by regulations. Certification of the rating may be included with box 100. Certification may also be affixed on box 100, either on a label or permanently impressed into box 100 by stamping, etching or some similar process.

Figure 3:
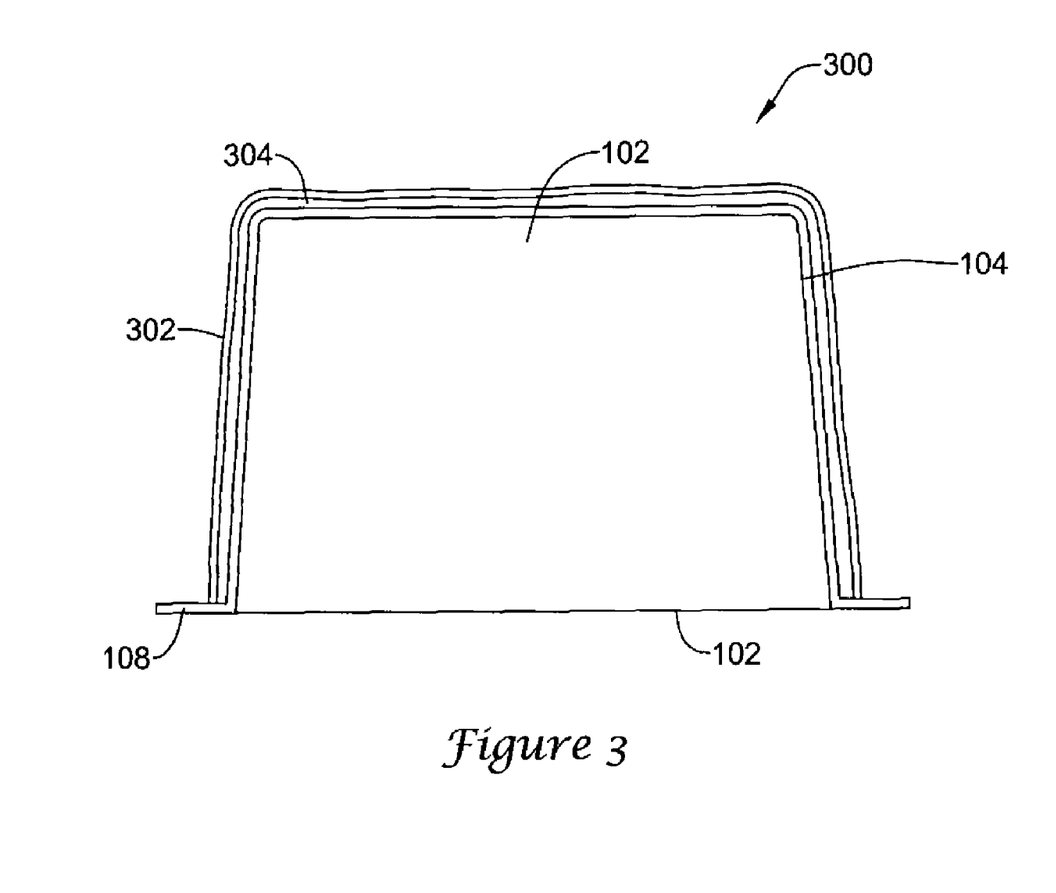
FIG. 3 is a cross sectional diagrammatic view of a box 300 for providing fire resistance according to the invention.

FIG. 3 is a cross-sectional diagrammatic side view of a box 300 for use in a fire barrier. Box 300 generally includes a cavity 102 defined by a wall 104. Opening 106 provides access to cavity 102 and flange 108 is disposed proximate opening 106. Box 300 also includes a plenum wrap layer 302. A plenum wrap is a fire resistant wrap having a fire resistant blanket material disposed between two foil layers. Suitable plenum wrap materials are manufactured by 3M Corporation. Plenum wrap layer 302 surrounds the outside of wall 104. Plenum wrap layer 302 may be formed by taping plenum wrap material into the desired shape using foil tape or by folding plenum wrap material into a desired shape or by other suitable process. A gap 304 may be formed between plenum wrap layer 302 and wall 104 if desired. It may be desirable to form plenum wrap layer 302 so that none of the fire resistant blanket material is exposed. Plenum wrap layer 302 may be fastened to wall 104 or flange 108 using foil tape, high temperature adhesive, or other suitable method. Of course, box 300 may include opening 116 and intumescent ring 118 or punch-outs, if desired. One contemplated alternative configuration is to put the plenum wrap layer on the inside of wall 104. Box 300 may be installed into a fire barrier such as fire barrier 200 and rated as described with respect to fire barrier 200 above. In one alternative embodiment, the plenum wrap layer is packaged separately from the box. The plenum wrap layer would then be installed into the fire barrier, by first installing onto the box, or by some other appropriate method.

In one example embodiment, a box such as box 300 is, for example 8½ to 9½ inches deep and is installed in a fire barrier having a distance between the first and second layers (e.g. a ceiling and the floor or attic substrate above) of only slightly more than 9½ inches. This embodiment may be rated to one hour of fire resistance, a rating that may not be possible if box 300 lacked the plenum wrap layer.

Figure 4:
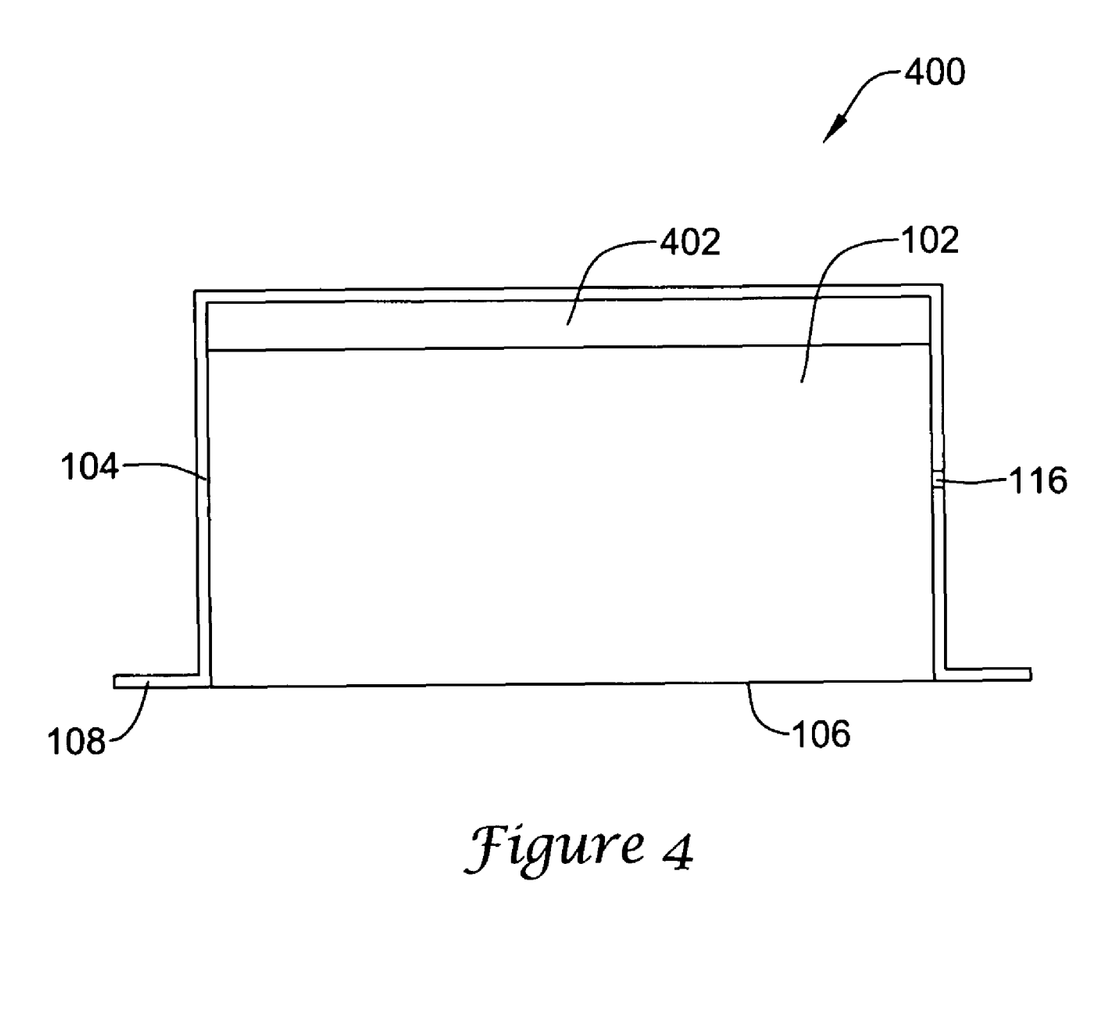
FIG. 4 is a cross-sectional diagrammatic view of a box 400 for providing fire resistance according to the invention.

FIG. 4 is a diagrammatic cross-sectional side view of a box 400 for use in a fire barrier. Box 400 generally includes a cavity 102 defined by a wall 104. Opening 106 provides access to cavity 102 and flange 108 is disposed proximate opening 106. Box 400 includes an intumescent layer 402. Intumescent layer 402 may be a pre-cut sheet of intumescent material adhesively fixed to wall 400 or may be a layer of intumescent mastic or paint applied to wall 400. Intumescent layer 402 is shown disposed on the portion of wall 104 opposite opening 106. In other contemplated embodiments, intumescent layer 402 is disposed on all inside surfaces of wall 104, or on one or more portions of the outside surface of box 400, as desired. In the embodiment shown, when intumescent layer 402 is exposed to heat or flame, it will expand and substantially fill cavity 102 with a hard char. Of course other embodiments are contemplated. For example, desired features of boxes 100 or 300 may be incorporated into box 400. Box 300 may be installed into a fire barrier such as fire barrier 200 and rated as described with respect to fire barrier 200 above.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A fire resistant assembly, comprising:
a first layer having a lumen therein; a second layer adjacent the first layer; and a box having a cavity defined in part by a plurality of walls, a first opening to the cavity, a flange proximate the first opening, a second opening in one of the walls, and a pre-molded intumescent ring disposed about the second opening, wherein the box is disposed between the first layer and the second layer and wherein the first opening is disposed on the lumen of the first layer.

2. The assembly of claim 1, wherein an angle between the flange and one of the walls is approximately 90 degrees.

3. The assembly of claim 1, wherein an angle between the flange and one of the walls is greater than 90 degrees.

4. The assembly of claim 1, wherein the walls comprises material having melting temperature greater than 1700° Fahrenheit.

5. The assembly of claim 1, wherein the walls comprises steel that is at least as thick as 30 gauge steel.

6. The assembly of claim 1, wherein the walls comprises steel that is at least as thick as 24 gauge steel.

7. The assembly of claim 1, wherein the lumen has a perimeter that is smaller than a perimeter of the opening.

8. The assembly of claim 1, further comprising a device disposed in the lumen and extending into the cavity.

9. The assembly of claim 8, further comprising a gap between the device and the on of the walls.

10. The assembly of claim 8, wherein the device is a electrical device.

11. The assembly of claim 10, having an American society for the testing materials (ASTM E 119) fire endurance rating of 2 hour or its equivalent.

12. The assembly of claim 1, further comprising a gap between the box and the second layer.

13. The assembly of claim 1, wherein the opening is formed by the removal of a punch-out.

14. The assembly of claim 1, wherein the at least one of the walls comprises a removable area defined by one or more narrow grooves.

15. The assembly of claim 1, having an American society for the testing materials (ASTM E 119) fire endurance rating of 2 hour or its equivalent.

16. The assembly of claim 15, further comprising a label certifying the box to have the American society for the testing materials (ASTM E 119) fire endurance rating.

17. The assembly of claim 1, wherein the walls are impervious to air flow.

18. A method of providing a fire barrier in a building, the steps comprising: providing a first layer; providing a lumen in the first layer; providing a second layer; providing a box having a cavity defined in part by a plurality of walls, a first opening to the cavity, and a flange proximate the opening disposed between the first layer and the second layer such that the opening in the box covers the lumen in the first layer, the -cavity being free of intumescent material; providing a second opening in one of the walls; providing a pre-molded intumescent ring disposed around the second opening; disposing a device in the lumen and extending into the cavity of the box; and disposing conduit through the second opening.

19. The method of claim 18, wherein the steps of providing the box, providing the second opening and providing the ring are performed simultaneously.

20. The method of claim 18, wherein the step of providing the second opening includes the step of removing a punch-out from one of the walls of the box.

21. The method of claim 18, wherein the step of providing the ring comprises the step of providing an intumescent material selected from the group of putty, mastic, or paint.

22. The method of claim 18, wherein the step of providing the ring is performed after the step of disposed conduit through the second opening.

23. The method of claim 18, wherein the device is an electrical device and wherein the conduit is electrical conduit.

24. A fire resistant assembly, comprising: a first layer having a lumen therein; a second layer adjacent the first layer; a first structural member disposed between the first and second layers; and a box having a cavity defined in part by a plurality of walls, a first opening to the cavity, a flange proximate the first opening and parallel the first layer, and an intumescent layer disposed proximate the walls, wherein the box is disposed between the first layer and the second layer and wherein the first opening is disposed on the lumen of the first layer.

25. The assembly of claim 24 wherein the walls comprises a base wall and a perimeter wall and wherein the intumescent layer is proximate the base wall.

26. The assembly of claim 24, the walls having an inside surface defining the cavity and an outside surface, the intumescent layer being disposed against the inside surface.

27. The assembly of claim 24, the walls having an inside surface and an outside surface, the intumescent layer being disposed against the outside surface.

28. The assembly of claim 24, wherein the intumescent layer comprises a paint applied to the walls.

29. The assembly of claim 24, wherein the intumescent layer comprises a mastic applied to the walls.

30. The assembly of claim 24, wherein the intumescent layer comprises a pre-formed intumescent sheet.

31. A fire resistant assembly, comprising: a first layer having a lumen therein; a second layer adjacent the first layer; a first structural member disposed between the first and second layers; and a box having a cavity defined in part by a plurality of walls, a first opening to the cavity, a flange proximate the first opening and parallel the first layer, and a plenum wrap layer disposed proximate the walls, the walls having an inside surface and an outside surface, wherein the box is disposed between the first layer and the second layer and wherein the opening is disposed on the lumen of the first layer.

32. The assembly of claim 31, wherein the plenum wrap layer is disposed on the outside surface of the walls.

33. The assembly of claim 32, wherein the plenum wrap layer covers the whole outside surface of the walls.

34. The assembly of claim 31, wherein the plenum wrap layer is disposed in the cavity and has an opening proximate the first opening.

35. The assembly of claim 31, further comprising a gap between one of the walls and the plenum wrap layer.

36. The assembly of claim 31, wherein the box further comprises a second opening and an intumescent ring around the second opening.

* * * * *

UNITED STATES PATENT AND TRADEMARK OFFICE
CERTIFICATE OF CORRECTION

PATENT NO. : 7,812,253 B2  Page 1 of 1
APPLICATION NO. : 10/988794
DATED : October 12, 2010
INVENTOR(S) : Happy Moselle It is certified that error appears in the above-identified patent and that said Letters Patent is hereby corrected as shown below:

Column 5
Line 64 delete "the on of the walls." and insert therefor -- on the walls. --

Column 6
Line 8 delete "wherein the at least" and insert therefor -- wherein at least --

Line 25-26 delete "the-cavity" and insert therefor -- the cavity --

Column 8
Line 7 delete "one of the walls" and insert therefor -- the wall --

Signed and Sealed this

Thirtieth Day of November, 2010

David J. Kappos
*Director of the United States Patent and Trademark Office*